(12) United States Patent
Miousset et al.

(10) Patent No.: US 7,903,245 B2
(45) Date of Patent: Mar. 8, 2011

(54) MULTI-BEAM OPTICAL PROBE AND SYSTEM FOR DIMENSIONAL MEASUREMENT

(76) Inventors: Marc Miousset, Saint-Bruno (CA); Jacques Fourot, Montreal (CA)

(*) Notice: Subject to any disclaimer, the term of this patent is extended or adjusted under 35 U.S.C. 154(b) by 193 days.

(21) Appl. No.: 12/229,205

(22) Filed: Aug. 20, 2008

(65) Prior Publication Data

US 2009/0051938 A1    Feb. 26, 2009

Related U.S. Application Data

(60) Provisional application No. 60/966,290, filed on Aug. 28, 2007.

(30) Foreign Application Priority Data

Aug. 20, 2007    (CA) .................................... 2597891

(51) Int. Cl.
*G01N 21/00* (2006.01)
(52) U.S. Cl. .................................... 356/241.1; 356/625
(58) Field of Classification Search .......... 356/625–640, 356/241.1–241.3
See application file for complete search history.

(56) References Cited

U.S. PATENT DOCUMENTS

| | | | |
|---|---|---|---|
| 3,589,815 A | 6/1971 | Hosterman | |
| 3,806,252 A | 4/1974 | Harris et al. | |
| 3,885,875 A | 5/1975 | Rosenfeld et al. | |
| 3,940,608 A | 2/1976 | Kissinger et al. | |
| 4,204,772 A | 5/1980 | Balasubramanian | |
| 4,349,277 A | 9/1982 | Mundy et al. | |
| 4,377,343 A | 3/1983 | Monson | |
| 4,403,860 A | 9/1983 | Pryor | |
| 4,561,766 A | 12/1985 | Fox | |
| 4,574,199 A | 3/1986 | Pryor | |
| 4,596,460 A | 6/1986 | Davinson | |
| 4,733,969 A | 3/1988 | Case et al. | |
| 4,766,305 A | 8/1988 | Fahl | |
| 4,822,877 A | 4/1989 | Takahashi | |
| 4,875,177 A | 10/1989 | Jarman | |
| 5,028,798 A * | 7/1991 | Biswas et al. ............ | 250/559.21 |
| 5,118,192 A | 6/1992 | Chen et al. | |
| 5,319,442 A | 6/1994 | Rosser | |
| 5,319,567 A | 6/1994 | Ebenstein | |
| 5,381,236 A | 1/1995 | Morgan | |
| 5,446,549 A | 8/1995 | Mazumder et al. | |
| 5,504,345 A | 4/1996 | Bartunek et al. | |
| 5,508,806 A | 4/1996 | Dowdy et al. | |
| 5,682,236 A | 10/1997 | Trolinger et al. | |
| 5,815,275 A | 9/1998 | Svetkoff et al. | |
| 5,822,877 A | 10/1998 | Dai | |
| 5,871,391 A | 2/1999 | Pryor | |
| 5,933,231 A * | 8/1999 | Bieman et al. ............ | 356/241.1 |

(Continued)

FOREIGN PATENT DOCUMENTS

CA    1 189 316    6/1985

(Continued)

*Primary Examiner* — Hoa Q Pham
(74) *Attorney, Agent, or Firm* — Muirhead and Saturnelli, LLC

(57) ABSTRACT

A multi-beam optical probe according to illustrative embodiments of the present invention generally reduce the limitations, difficulties and disadvantages of the conventional measurement devices and techniques by providing a non-contact multi-beam optical probe apparatus and system for the dimensional measurement of objects. The narrow elongated probe provides at least two orthogonal, divergent or parallel laser beams, the reflection of each beam on the object being simultaneously detectable without moving the probe.

35 Claims, 14 Drawing Sheets

U.S. PATENT DOCUMENTS

| | | | |
|---|---|---|---|
| 5,986,761 A | 11/1999 | Crawforth et al. | |
| 6,049,384 A | 4/2000 | Rudd et al. | |
| 6,064,759 A | 5/2000 | Buckley et al. | |
| 6,069,689 A | 5/2000 | Zeng et al. | |
| 6,094,269 A | 7/2000 | Ben-Dove et al. | |
| 6,181,472 B1 | 1/2001 | Liu | |
| 6,211,506 B1 | 4/2001 | Pryor et al. | |
| 6,320,665 B1 | 11/2001 | Ngoi et al. | |
| 6,339,570 B1 | 1/2002 | Kikuchi et al. | |
| 6,353,478 B1 | 3/2002 | Rudd et al. | |
| 6,392,247 B1 | 5/2002 | Cerny et al. | |
| 6,462,815 B1 * | 10/2002 | Drabarek et al. | 356/241.1 |
| 6,542,304 B2 | 4/2003 | Tacklind et al. | |
| 6,610,992 B1 | 8/2003 | Macaulay et al. | |
| 6,639,662 B2 | 10/2003 | Vaez-Iravani et al. | |
| 6,757,069 B2 | 6/2004 | Bowles | |
| 6,781,699 B2 * | 8/2004 | Dunn et al. | 356/511 |
| 6,909,500 B2 | 6/2005 | Meeks | |
| 6,917,421 B1 | 7/2005 | Wihl et al. | |
| 6,952,270 B2 | 10/2005 | Shirley | |
| 7,016,052 B2 | 3/2006 | Bloch et al. | |
| 7,369,225 B2 | 5/2008 | Messerschmidt et al. | |
| 2004/0246473 A1 | 12/2004 | Hermary et al. | |
| 2004/0254476 A1 | 12/2004 | Quadling et al. | |
| 2005/0107184 A1 * | 5/2005 | Farmiga et al. | 473/332 |
| 2006/0109480 A1 | 5/2006 | Hidaka | |
| 2006/0232787 A1 | 10/2006 | Hoffmann et al. | |

FOREIGN PATENT DOCUMENTS

| | | |
|---|---|---|
| CA | 1 284 834 | 6/1991 |
| CA | 2 089 105 | 8/1994 |
| CA | 2 249 451 | 9/1997 |
| CA | 2 322 189 | 9/1999 |
| CA | 2 355 756 | 2/2002 |
| CA | 2 518 976 | 9/2004 |
| EP | 0 310 235 A2 | 4/1989 |
| EP | 1 102 087 A3 | 5/2001 |
| EP | 0 916 071 B1 | 2/2003 |
| JP | 9-26173 | 1/1997 |
| JP | 2000166585 A1 | 6/2000 |
| WO | WO94/15173 | 7/1994 |
| WO | WO98/07001 | 2/1998 |

* cited by examiner

FIG_1

FIG_2

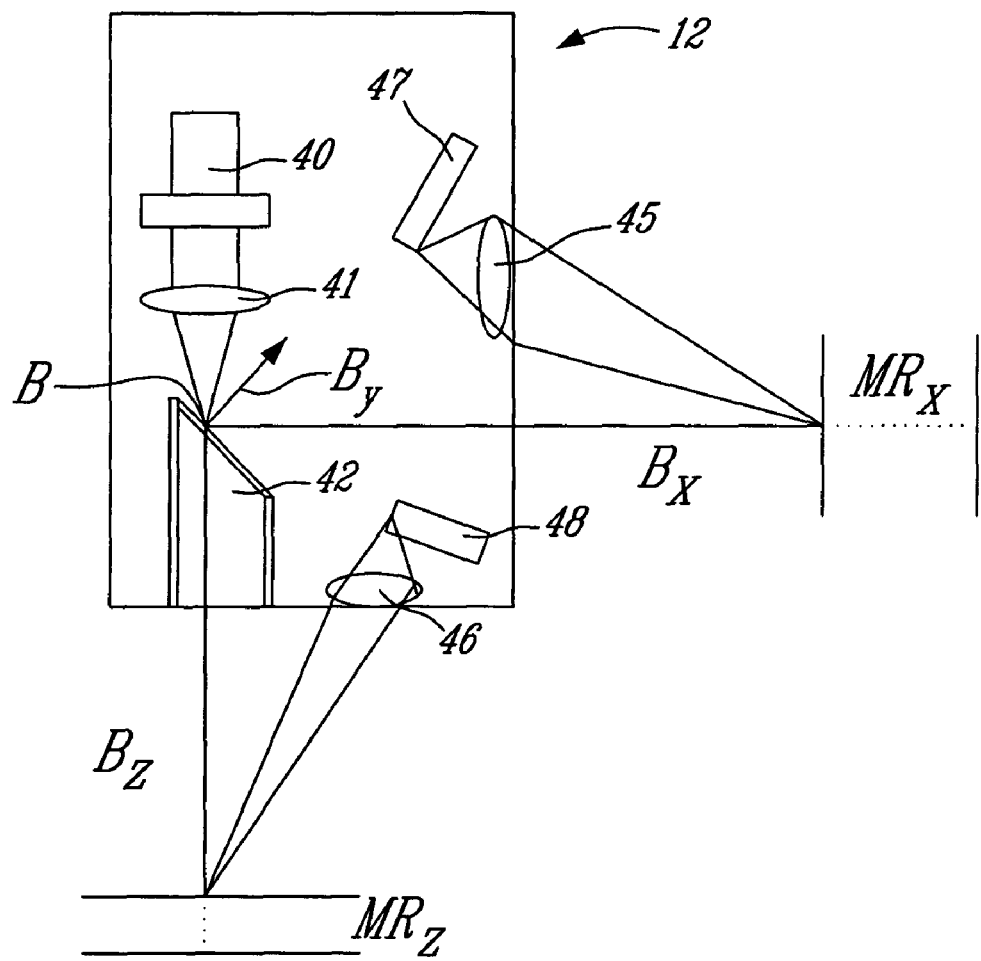
FIG_4A

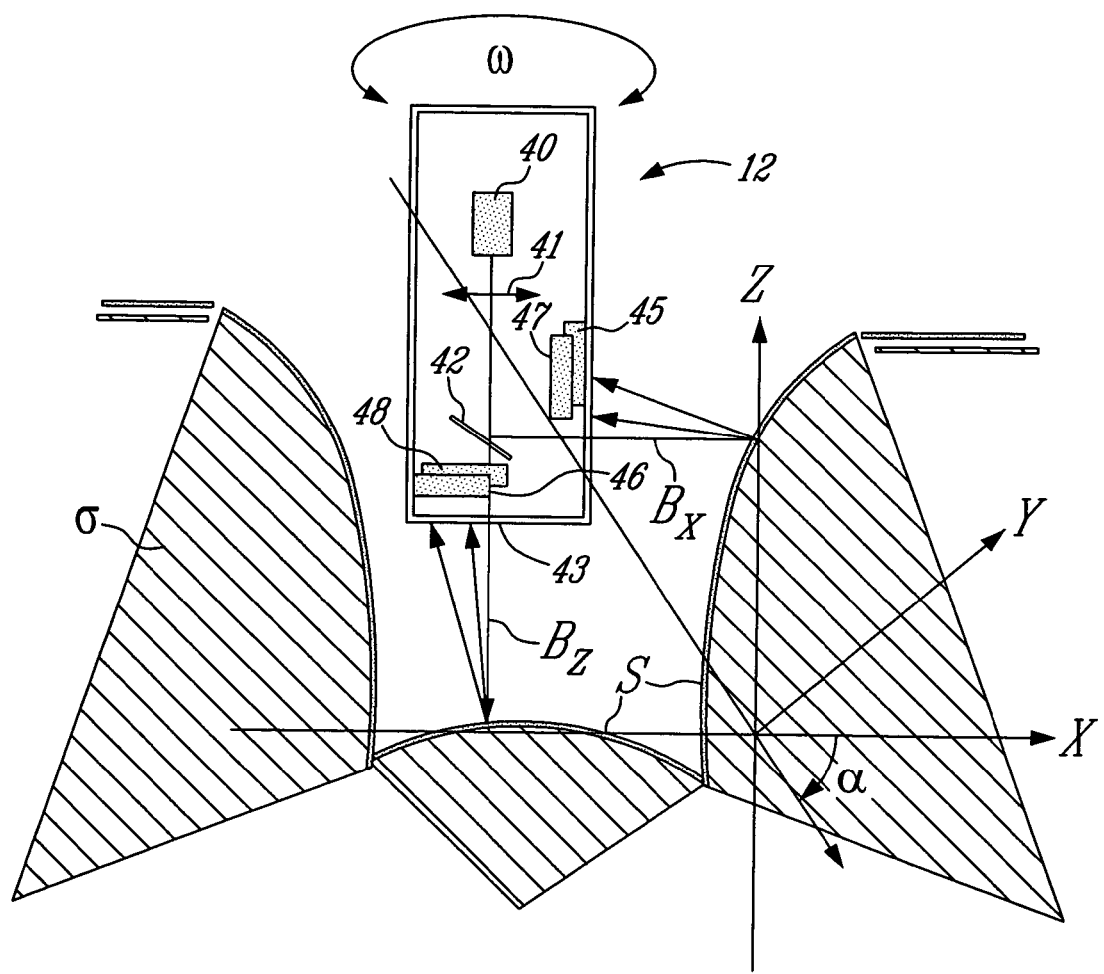
FIG_4B

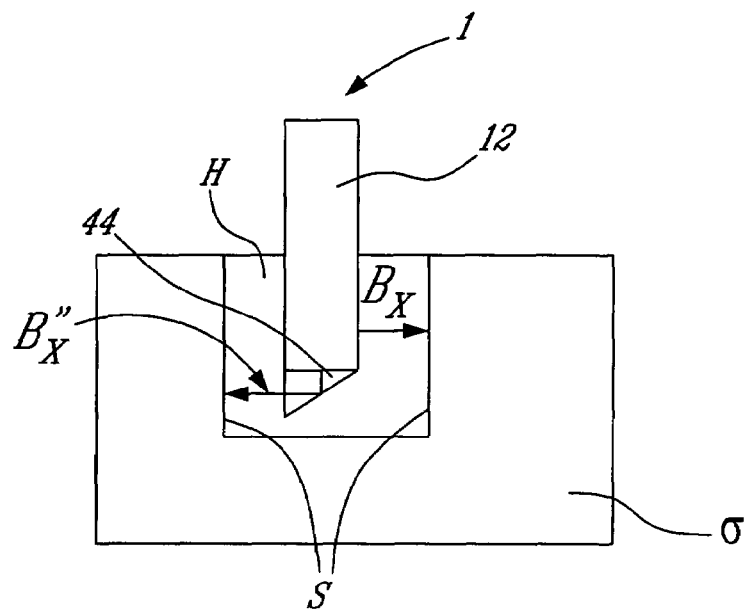
FIG_10
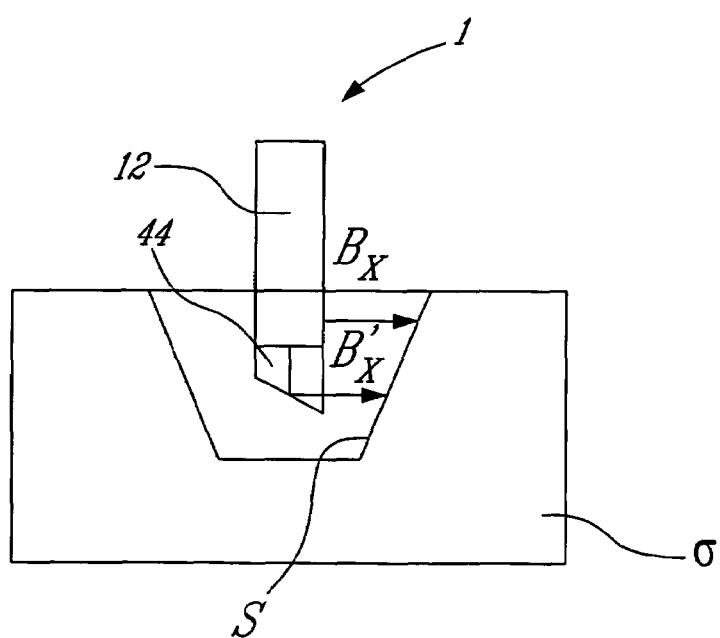
FIG_11

MULTI-BEAM OPTICAL PROBE AND SYSTEM FOR DIMENSIONAL MEASUREMENT

CROSS-REFERENCE TO RELATED APPLICATIONS

This application claims priority to U.S. provisional application No. 60/966,290 filed on Aug. 28, 2007, which is incorporated by reference herein.

FIELD

The present invention generally relates to non-contact dimension measurement apparatuses and systems. More specifically, the invention relates to dimensional measurement electro-optical sensor probes and related systems using a plurality of independently detected laser beams.

BACKGROUND

In many applications, such as manufacturing and machining quality control, dimensional information about objects must be accurately measured. Different types of apparatus known as "CMM" (Coordinate Measuring Machine) exist for that purpose using either of a contact type probe or a non-contact type probe mounted on a robotic or CNC machine arm for displacement. However, contact type probes are subject to costly damages in the event of a crash due to their closer behavior with the object, which is less of a problem with non-contact probes such as optical probes. Nevertheless, optical probes of the prior art have a generally lower resolution and none of the existing probes allow for the simultaneous measurement of a plurality of points without moving the supporting arm, which further increases the cumulative error on the measured values.

It is known in the art of non-contact dimensional measurement probes to use a source of substantially collimated generally monochromatic light such as a single point laser beam to measure dimensional properties of objects (targets), such as manufactured or machined parts or assemblies, using a triangulation technique. Basically, dimensional measurements are performed by determining distances between a reference point and a measured point of an object toward which a laser beam is aimed.

According to the well known principle of optical triangulation taught namely in U.S. Pat. No. 6,211,506 entitled "Method and Apparatus for Optically Determining the Dimension, Location and Attitude of Objects", issued to Pryor at al. in April 2001, the distance between a reference point and a measured point is a function of the angle made by the reflected/scattered light from the beam hitting the object's surface, the angle being obtained from the analysis of the image formed by the scattered light on an appropriately positioned photoelectric detector such as a CCD digital camera (linear or 2D matrix) through appropriate optical devices. However, the single directional light beam suffers from numerous limitations. For example, measuring drilled bore diameters or slopes requires complex supporting arm displacements which introduce mechanical errors and are time consuming or may not be possible at all in the case of small holes.

In an attempt to solve some of these problems of the prior art probes and methods, probes using a beam splitter to provide two parallel laser beams, each beam being detected by its own detector, have been developed. U.S. Pat. No. 6,211,506 entitled "Method and apparatus for electro-optically determining the dimension, location and attitude of objects" issued to Pryor et al. in April 2001 discloses such a probe. Although that technique may be helpful for rapid measurement of certain slopes, it still does not enable measurements in small deep cavities nor provide the flexibility for performing measurements in two or three orthogonal axis at the same time to speed up the procedure, while optimizing accuracy. Providing a plurality of non-parallel diverging beams could help facing such challenges and could also prevent collisions between the probe and the object by enabling "visual" feedback during displacements.

In U.S. Pat. No. 4,766,305 entitled "Optical surface test apparatus for testing constricted surface areas" issued to Fahl in August 1988, a specially designed probe is provided for the acquisition of dimensional data about constricted areas such as bore holes. However, it is still limited to one measure at a time and can not be reconfigured for the acquisition of surface profile data, having its single laser beam oriented perpendicular to the probe axis. Furthermore, it does not enable simultaneous measurements of a plurality of points in potentially different directions.

Therefore, it is desired to overcome or reduce at least some of the above-described problems and limitations of the prior art.

SUMMARY

In accordance with an illustrative embodiment of the present invention, there is provided a multi-beam optical probe for the dimensional measurement of an object provided with a surface; the probe comprising:
  at least one light source;
  a first optical device for forming a first focused light beam aiming at the surface of the object in a first direction;
  a first optical sensor so configured as to detect the light from the first beam scattered from the surface of the object;
  a second optical device for forming a second focused light beam aiming at the surface of the object in a second direction; and
  a second optical sensor so configured as to detect the reflection of the second beam scattered from the surface of the object;
  whereby the first and second optical devices may adopt at least one attitude in which the second direction is not parallel to the first direction.

According to another aspect of the present invention, there is provided a multi-beam optical probe system for the dimensional measurement of an object provided with a surface; the probe system comprising:
  a multi-beam optical probe comprising:
  at least one light source;
  a first optical device for forming a first focused light beam aiming at the surface of the object in a first direction;
  a first optical sensor so configured as to detect the light from the first beam scattered from the surface of the object;
  a second optical device for forming a second focused light beam aiming at the surface of the object in a second direction; the first and second optical devices may adopt at least one attitude in which the second direction is not parallel to the first direction; and
  a second optical sensor so configured as to detect the reflection of the second beam scattered from the surface of the object;
  a multi-axis controllable moving arm to which the multi-beam optical probe is so mounted as to be moved thereby;

a controller controlling both the multi-beam optical probe and the multi-axis controllable moving arm and receiving data from the first and second optical sensors.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "optical fiber" is to be construed herein and in the appended claims as any optical waveguide.

Other objects, advantages and features of the present invention will become more apparent upon reading of the following non-restrictive description of illustrative embodiments thereof, given by way of example only with reference to the accompanying drawings.

Illustrative embodiments of the present invention generally reduce the limitations, difficulties and disadvantages of the aforesaid measurement devices and techniques of the prior art by providing a non-contact multi-beam optical probe apparatus, system and related methods for the dimensional measurement of objects. The narrow elongated probe of the various illustrative embodiments of the present invention provides at least two orthogonal, divergent or parallel laser beams, the reflection of each beam on the object being simultaneously detectable without moving the probe. Further, the optional use of a very small blue laser light beams featuring a shorter wavelength and higher energy than the usual red beams, expands the zone of clear detection and increases accuracy to better than 5 microns, whilst currently available commercial laser sensors range to about ±50 microns.

It will be appreciated that the illustrative embodiments of the present invention described herein generally obviate the limitations and drawbacks of the prior art devices and methods, namely by improving data diversity and accuracy, reducing equipment size, complexity and cost, reducing set-up time, and accelerating the inspection time for optimal productivity. It will also be appreciated that miscellaneous related analysis methods can be contemplated which provide a wide range of information data to comply with a broad range of applications, and more particularly the quality control of complex machined parts that can not be carried out with known devices in a timely and cost efficient manner.

BRIEF DESCRIPTION OF THE DRAWINGS

Further aspects and advantages of the present invention will become better understood with reference to the description in association with the following figures. Note that similar numerals represent similar parts throughout figures.

FIGS. 4a and 4b are schematic illustrations of a multi-beam laser probe tip according to an illustrative embodiment of the invention;

FIG. 10 shows a still alternate probe configuration featuring parallel beams in opposite directions, being used detailed analysis of a bore hole peripheral wall without requiring vertical displacement of the probe;

FIGS. 11 and 12 show applications similar to those of FIGS. 9 and 10, wherein mechanical rotation or translation of the probe is used to analyze the details of conical walls;

DETAILED DESCRIPTION

Figure 1:
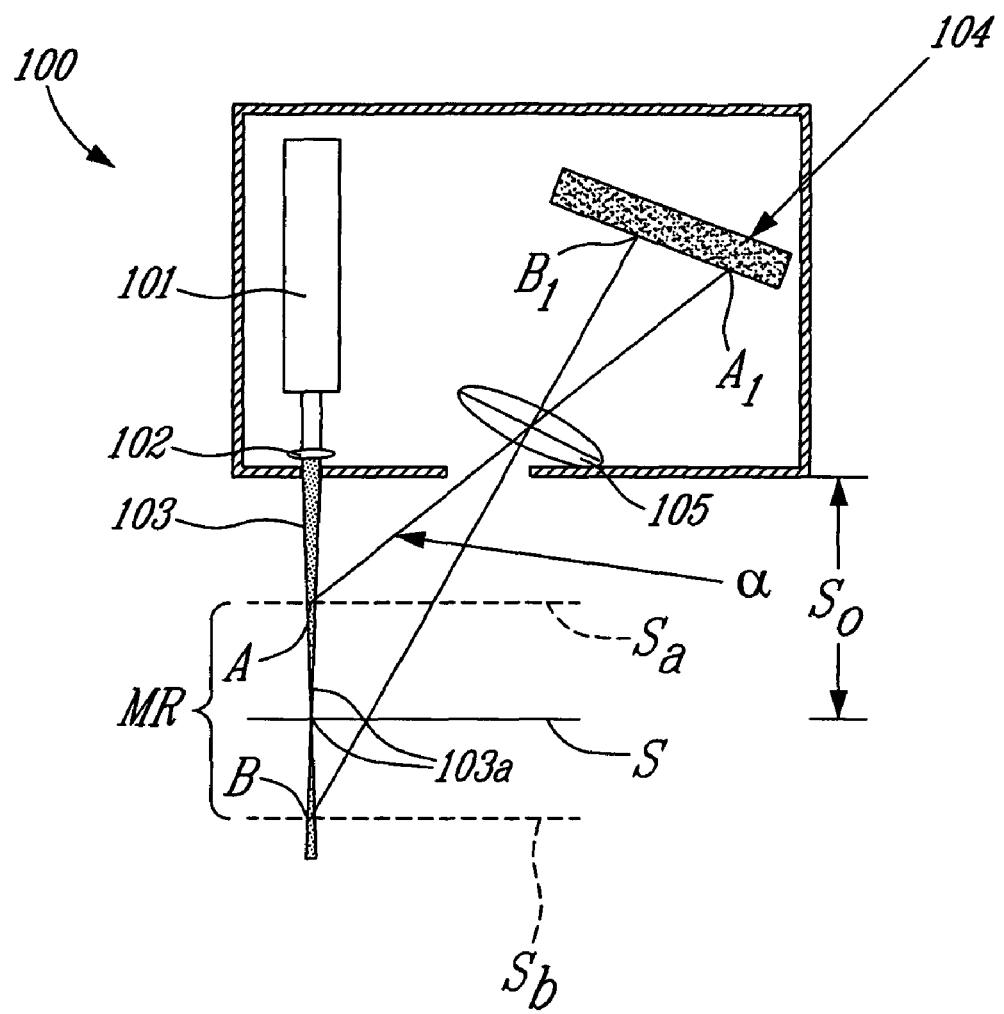
FIG. 1 is a schematic representation of a general triangulation laser sensor structure.

FIG. 1 shows a schematic representation of an optical sensor 100 based on the triangulation principle. The basic principle of triangulation involves a light source, almost always a laser 101, generating a small focused light beam through a converging lens 102 and projecting the beam 103 on a surface (Sa, S or Sb) to be measured, creating a spot of light A. At some angle α to the laser beam, from about 40 to about 45 degrees in high accuracy sensors, a convex lens 105 is used to form an image or "picture" of the spot on a photo-detector 104 at position A1. If the surface is farther away from the sensor, the spot on the surface is formed at position B, and the location of the spot shifts to position B1 on the photo-detector 104. By determining the exact position of the imaged spot (A1 or B1) on detector array 104 and calculating the angles involved, the distance from the sensor 100 to the surface (S, Sa or Sb) can be determined.

For accurate measurements, a tiny spot must be used, the smaller spot being generated at the focal point 103a of laser beam 103, located at a distance defined as the stand off distance SO from the sensor 100. A measurement range (MR) can therefore be defined being the range of valid measurement which depends on the variation of spot size along beam 103, spot light energy, detector characteristics such as device sensitivity, resolution and detecting area, and imaging optics.

Current sensing probes generally use a red laser diode for generating the light beam having a wavelength of about 620 to 690 nm. However, from the above information, it can be stated that using a blue laser diode with a wavelength of about 448 nm would improve detection and accuracy since the blue light has six time more energy than the red light, which facilitates small spot detection by a detector. The shorter wavelength of the blue light also improves spot image integrity for better accuracy.

Figure 2:
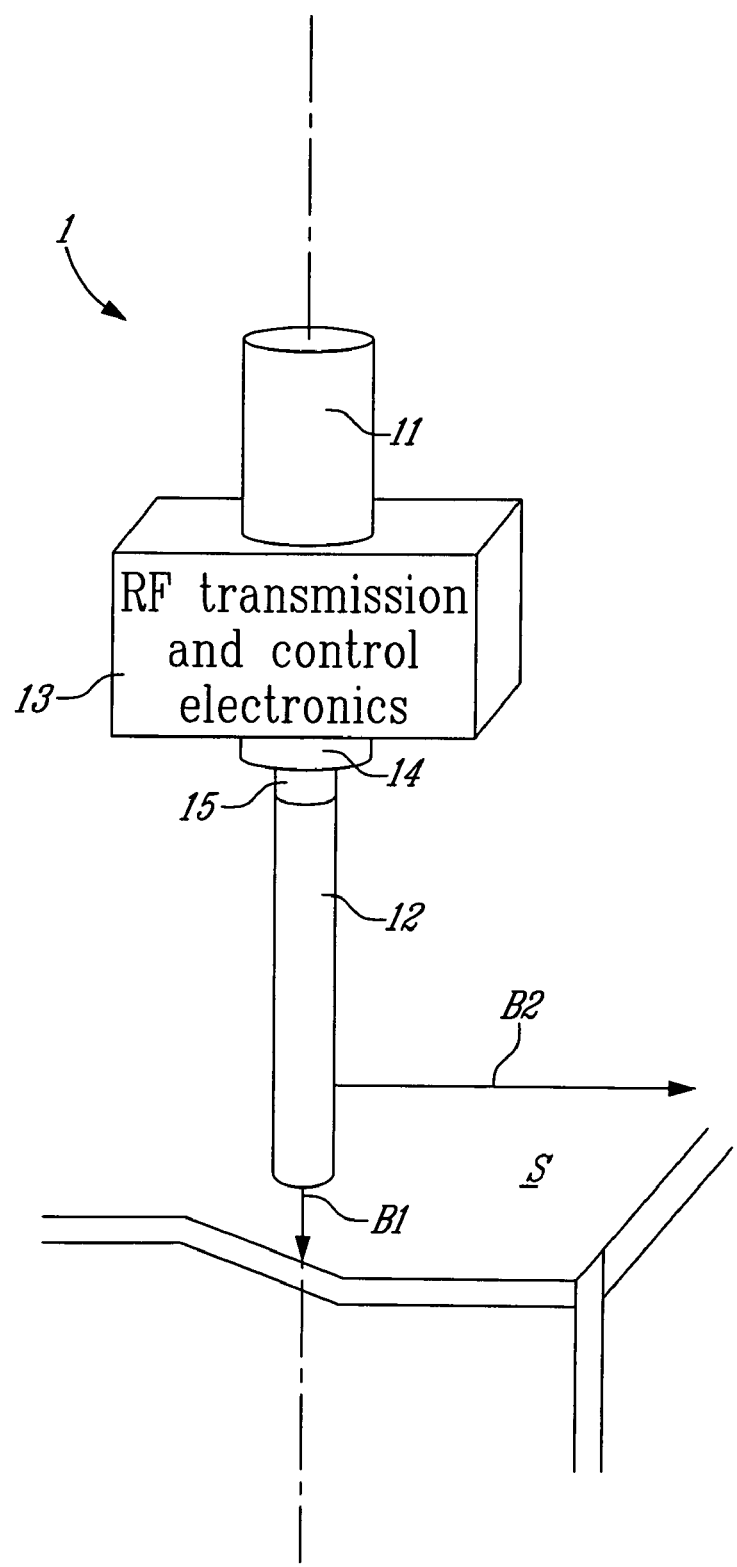
FIG. 2 is a schematic view of an electro-optic sensing probe according to an illustrative embodiment of the present invention.
Figure 3:
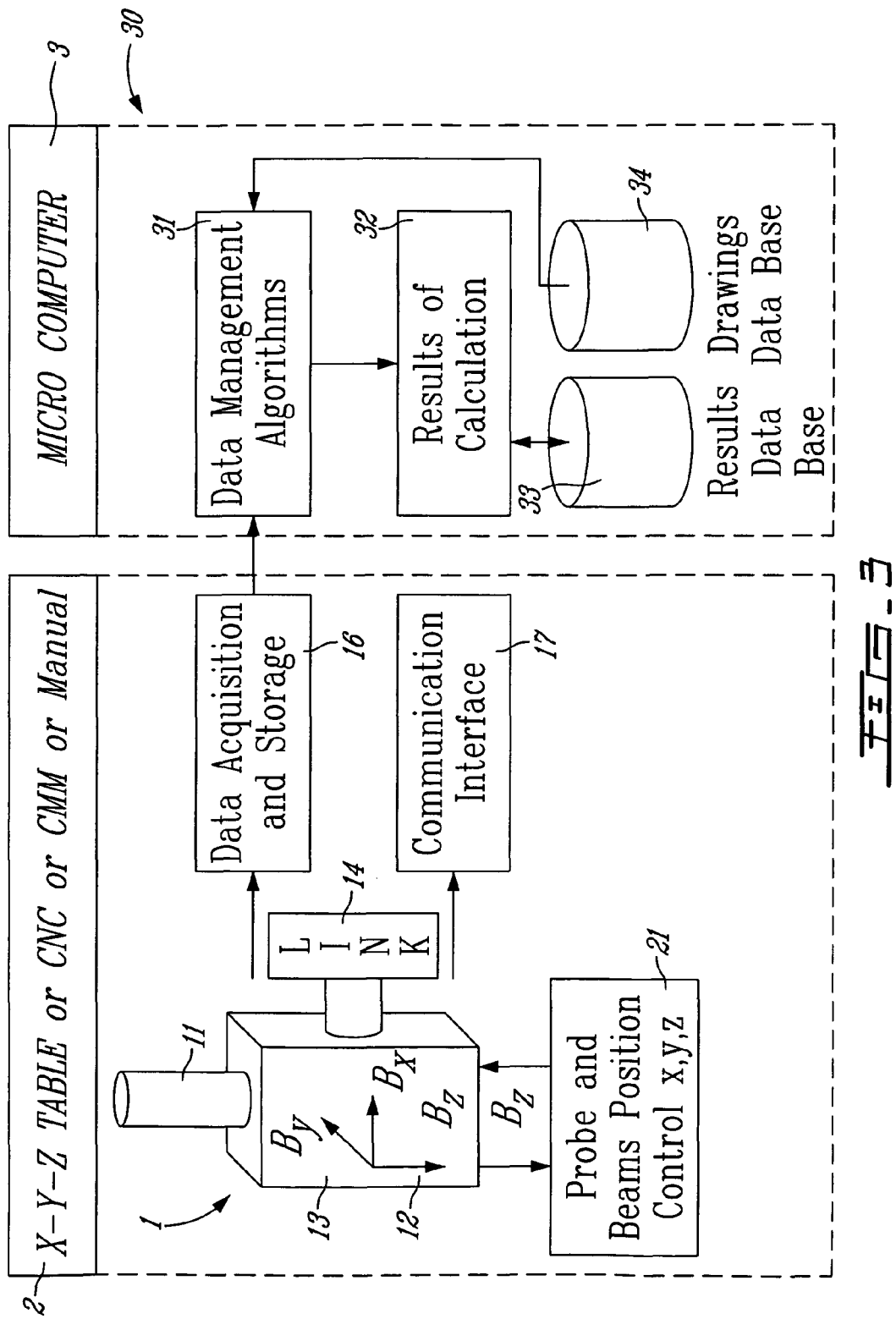
FIG. 3 is a schematic representation of a dimensional measurement system according to an illustrative embodiment of the present invention.

Referring to FIGS. 2 and 3, a sensing probe and a related system for dimensional measurement according to the present invention will now be generally described.

In FIG. 2, there is shown a general schematic view of an electro-optical sensor probe 1 according to an illustrative embodiment of the present invention. Basically, the probe 1 comprises a holding shank formed as a tool holder 11 mountable to a spindle of a machine tool, such as a CNC machine tool provided with an automatic tool changer. Thereby, the probe can be stored among the machining tools and automatically mounted on the spindle at any predetermined or elected time to operate dimensional measurement of a machined part or assembly.

The probe 1 further comprises a sensing tip 12, connected to a probe body 13 housing the control and wireless communication electronics and software, including a micro-controller handling transmissions and external requests, and a power source such as a battery (not shown). The tip 12 is connected to the body 13 through a sacrificial brittle mechanical link 14 for safety. Furthermore, a resilient axis 15 featuring multi-axis flexibility may optionally be interposed between to upper end of the probe tip and the safety mechanical link 14 for additional protection of the tip against impact damages. The mechanical link 14 may comprise a brittle ceramic member rigidly connecting the tip to the body while being susceptible to break in the event of a lateral or axial force component exceeding a predetermined value being applied on the tip 12. The safety mechanical link 14 can be shaped as a hollow cylinder to enable passage of hard wiring and/or optoelectronic links between the tip and the body 13. In the case of optoelectronic or optical links, solid optical glass such as an optical waveguide or optical fiber could be used as the mechanical link 14. A stress concentration groove may be provided at the periphery of the safety mechanical link 14 to promote rupture at a desired predetermined location. The link 14 can be easily replaced at low cost and prevents damages to occur on the complex sensor probe tip 12 in the event of a crash on a measured object for example. The ceramic material is chosen so to minimize deformations resulting from operating and environmental conditions (temperature, humidity, vibrations, etc.). In the illustrative embodiment of FIG. 2, the tip houses the main electro-optical devices and measures approximately 5 mm in diameter and 50 mm in length. Of course, these dimensions are not critical and other dimensions could be used.

There is further shown orthogonal laser beams B1 and B2 projecting from the probe tip 12 in the direction of different areas of a surface S to be measured. Beams may also be parallel or diverging with any angle from 0 to 180°, as will be described hereinbelow.

FIG. 3 represents a diagrammatic view of a complete system 30 to perform dimensional measurement using the electro-optical sensing probe 1. First, controlled mobility of the probe is provided through a multi-axis positioning structure 2 such as an X-Y-Z table, a CNC or a CMM machine providing accurate position control 21 of the probe 1 and the three orthogonal laser light beams Bx, By, Bz projecting therefrom. Alternatively, the probe 1 could be manually positioned.

In the body 13, control electronics and software 16 ensure data acquisition and the communication interface and software 17 provide for transmission of data and commands between the probe 1 and a control computer 3 which includes data management algorithms 31 providing results 32 to be stored and/or retrieved from result databases 33. Data management algorithms 31 may also access part drawing data from drawing databases 34 to properly and safely control displacement of the probe 1 and dynamically compare measured data and theoretical data in order to generate results and quality acceptance decisions. As aforementioned, a safety mechanical link 14 isolates the electro-optic components in the tip 12 from control and communication electronics 16 and 17 in body 13.

The non-contact optical measurement system 30 enables acquisition and analysis of three-dimensional data, from the inside as well as from the outside of a plurality of shapes, allowing measurement inside small cavities such as bore holes. The optical measurement system 30 may emit three 90° apart or otherwise oriented laser beams Bx, By, Bz defining a three orthogonal plane (trihedral) system that can be oriented as needed by moving the probe supporting arm 2 at least in the X, Y and Z directions, and preferably according to five degrees of freedom, adding rotation about the Z axis (yaw) and inclination of the X-Y plane (pitch). Thereby, a volume can be illuminated with collimated light. Reorientation of the beams may be performed during measurement to optimize measurement conditions. It is believed that simultaneous measurements in three orthogonal axes provide time savings by a factor of about 30 and reduce the impact of mechanical positioning errors on global accuracy. Associated data management algorithms 31 enable 2D and 3D shape reconstruction.

The system 30 may be used in two basic modes: Triangulation measurement in three directions, and creation of matrix images in three dimensions by scanning. The system thus enables inspection, measurement and calculation of surfaces, volumes, centers of gravity, moments of inertia, etc. on a single mechanical part or an assembly (object). Electronic data switching enables using data from individual beams or all beams for assisting in positioning the probe 1 about or inside the object to be inspected or measured.

There are many ways the system 30 may be operated. For example, the system 30 may be used to make measurements of a machined part. When this is the case, and when the drawing of the machined part to measure are in the drawing database, the probe 1 may be sequentially brought to predetermined locations about the machined parts and measurement made can be compared to dimensions of the drawings.

It is believed to be within the skills of one skilled in the art to determine the three-dimensional position of the probe 1 and the three-dimensional position of the object to be measured to thereby convert the distances measures by the probe into dimensions of the object.

It is to be noted that at some locations, the probe will be too far from the walls of the object to produce a measurement in at least one direction. Since the system 30 knows the theoretical measurements of the object and the measurement ranges of the probe, the system can determine when the probe is out of range.

Alternatively, instead of sequentially bringing the probe 1 to predetermined positions, it is possible to control the CMM, CNC or X-Y-Z table so that the probe is moved along predetermined paths about the object while taking measurements at predetermined interval.

Another use of the system 30 would be to take many measurements, either at predetermined locations or along predetermined paths and then interconnect the various 3d points using interpolation techniques.

Turning now to FIGS. 4a and 4b, the structure of a first illustrative embodiment of the optical sensor tip 12 of probe 1 will now be described in detail. FIG. 4b is a more schematic representation of the probe 1 of FIG. 4a shown in use, measuring an internal the surface S of an object.

The optical sensor tip 12 comprises a laser light source 40, for example a blue laser diode producing collimated light having a wavelength of about 448 nm for improved accuracy and sensitivity as stated above. The light from the laser light source 40 being focused into a small spot through convergent lens 41 to form the focused laser beam B. The focal length depends on the frequency of the light source, i.e. from about 448 to about 660 nm according to the desired accuracy.

Indeed, dispersion of the light scattering from the surface increases with the source wavelength, which produces a less concentrated spot image on the detector. In addition, higher frequency light (with shorter wavelength) dissipates more energy per photon (cf. Plank's law), which produces a higher intensity spot image on the detector, in turn increasing detection sensitivity and accuracy of spot position determination, that is distance measurement accuracy. Therefore, using a 448 nm light source instead of a conventional 660 nm red light source produces about six times more radiated energy for a given beam size.

Beam B is then split using the semi-reflective (semi-transparent with a low refraction index) mirror 42 oriented at 45 degrees with respect to the axis of incident beam B to form two orthogonal beams Bz and Bx projecting from the optical sensor tip 12. Of course, other types beam splitters, such as, for example prisms, could be used. It is believed that the use of prisms is interesting since mirrors that are always hit by laser beams at the same location can prematurely fail.

The mirror 42 may be actuated for rotation about the incident beam axis to enable a scanning mode without moving the articulated supporting arm 2, or for generating a third orthogonal beam By projecting from the tip in the Y direction by rapidly switching the angular position of the mirror 42. Hence, beam By can also be electronically rotated about the Z axis to any desired measurement position. Rapid commutation of the mirror position provides a quasi-simultaneous use of beams Bx and By following the data measurement software polling rate. The mirror 42 could be substituted by a full reflection rotating prism and a different orientation may be selected for similar results.

As will easily be understood by one skilled in the art, it would also be possible to add a second mirror (not shown) similar to and downstream of mirror 42, so positioned as to generate the third laser beam By.

The laser beams Bx, By and Bz may exit the tip through small apertures 43 (see FIG. 4b) to produce sharp tiny light beams for greater accuracy. Apertures 43 may have a rectangular shape measuring about 100μ by about 200μ, or may be remotely adjustable using an LCD variable aperture matrix, for example.

Beam Bz enables measurement on the Z axis and also enables feedback controlled positioning of the probe tip 12 in measured object cavities, provided the appropriate operating mode is selected. Beam Bz may also be reoriented parallel to beam Bx in the ZX plane as will be described hereinbelow with reference to FIGS. 6 and 7.

MRz and MRx indicate working ranges for the Z and X axes as previously described. These ranges are determined by the focal length and position of spot image detecting convergent lenses 45 and 46 respectively focusing the image of spots Bz and Bx on photo-detectors 47 and 48.

Similarly, an additional set of lens and a photo-detector not visible on the appended figures is provided in the Y axis for detection of reflection of beam By.

The photo-detectors 47 and 48 can be, for example, CCD (Charge coupled device) linear arrays or similar devices having adequate sensitivity to the selected laser wavelength and enabling digital filtering to preclude influence of light of different wavelength on spot position determination. Spot position may be determined, for example, by locating the pixels of higher intensity as it is well known in the art. Alternatively, an analogical detector such as a PSD (position-sensing detector or lateral effect photodiode) could also be used for similar results.

Depending on measurement conditions, it may happen that the spot image focuses out of the corresponding photo-detector boundary, which would prevent data acquisition. Therefore to further expand the probe versatility, a miniature actuator may be provided (not shown on the drawings) to electromechanically set the focal distance between a lens (45 and 46) and its corresponding detector (47 and 48). Thereby, measurement ranges MRz, MRx and/or MRy can be dynamically modified during measurement so as to optimize spot detection by the detectors 47, 48. Examples of miniature actuators include piezoelectric actuators and MEMS (Microelectromechanical Systems).

The piezoelectric actuator may be used to move the lens 45, 46 or the photo-detector 47, 48. Of course, other alternate known compact depth of field varying means can be used, such as variable focus liquid lenses or LCD variable aperture elements, for example.

Figure 5:
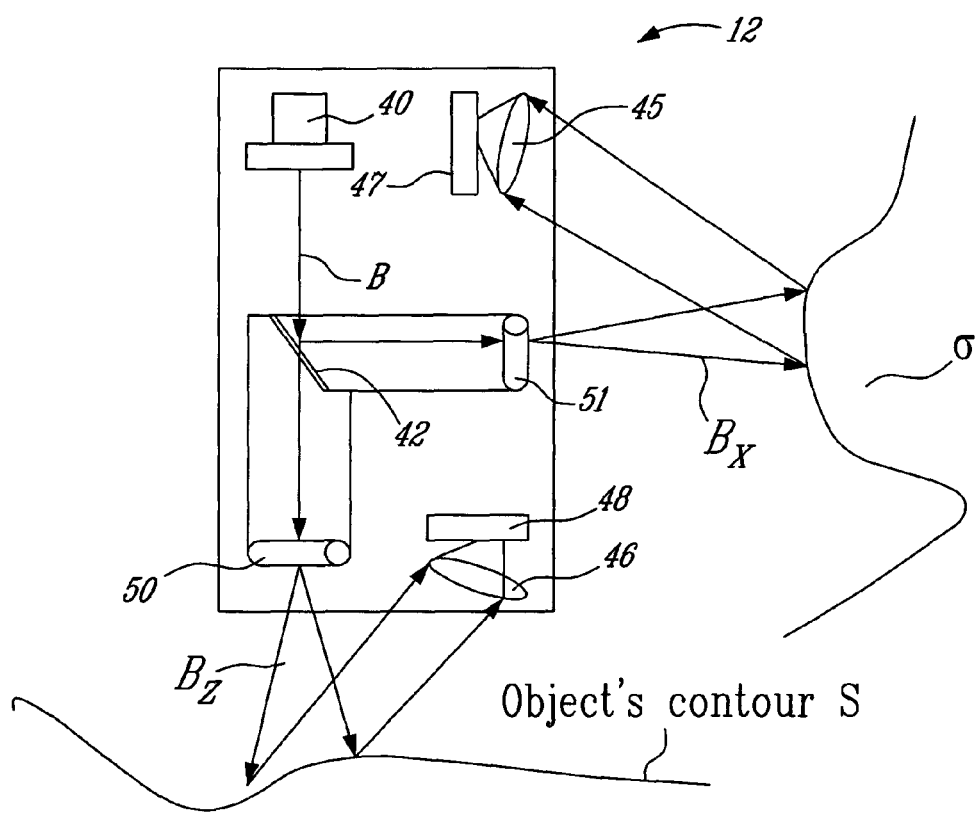
FIG. 5 is a schematic illustration of a multi-beam laser probe tip according to an illustrative embodiment of the invention wherein mirror positioning actuators are implemented.

FIG. 5 shows an illustrative embodiment of the probe tip 12 implementing mirror rotation or oscillation to produce electromechanically directed beams Bz, Bx and optionally By. Beam dispersion is provided by spinning or oscillating mirrors or prisms 50 and 51, which can be substituted by diverging lenses to produce a linear fan beam.

Figure 6:
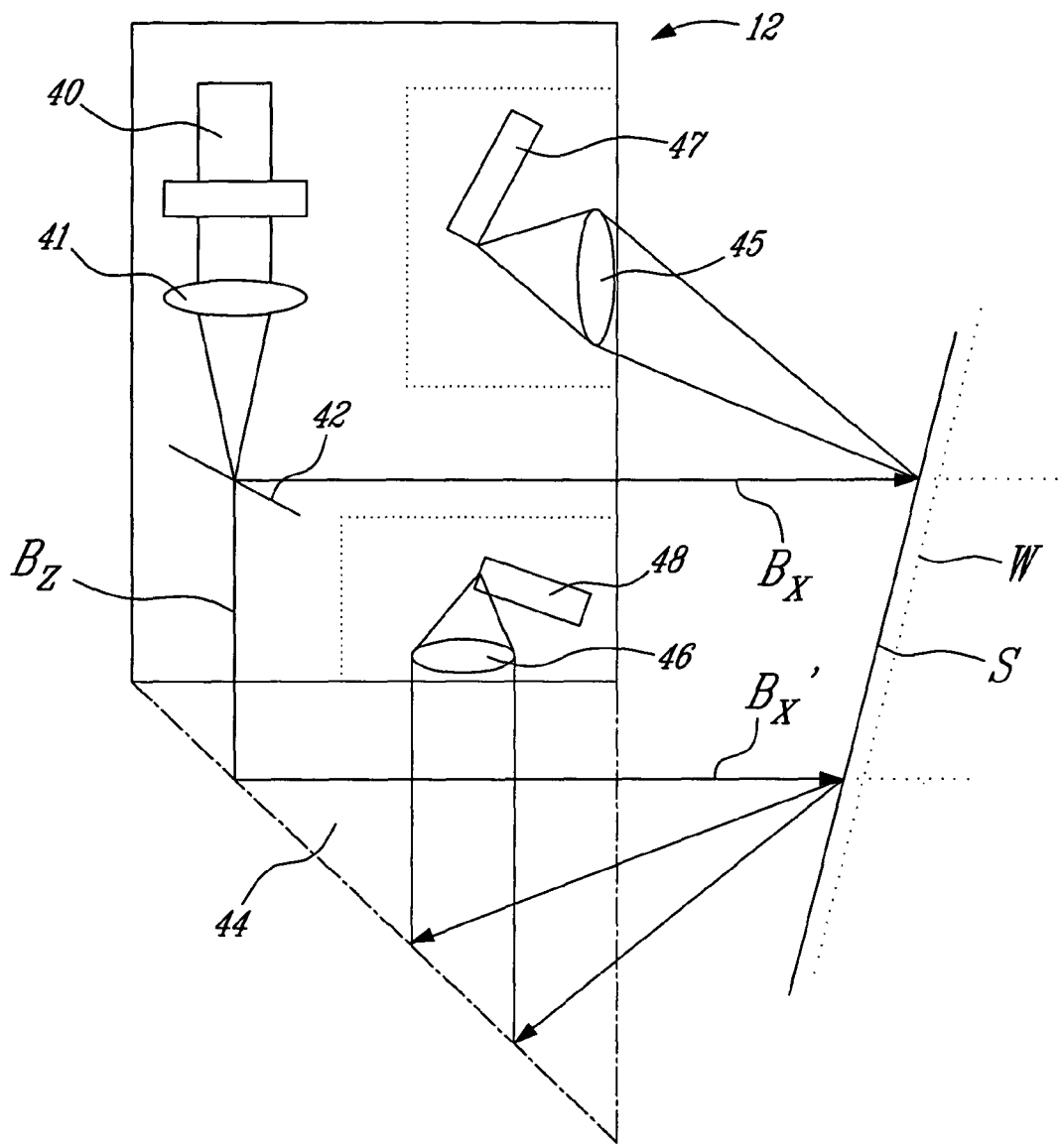
FIG. 6 is a schematic illustration of a multi-beam laser probe tip according to an illustrative embodiment of the invention wherein a prism is used to produce two parallel beams in the same direction.

FIG. 6 shows an illustrative embodiment of the multi-beam laser probe tip 12 wherein a prism 44 is used to deviate beam Bz so to produce a beam Bx' parallel to beam Bx in plane ZX and in the same direction for differential measurement of a sloped wall surface S of a measured object.

Figure 7:
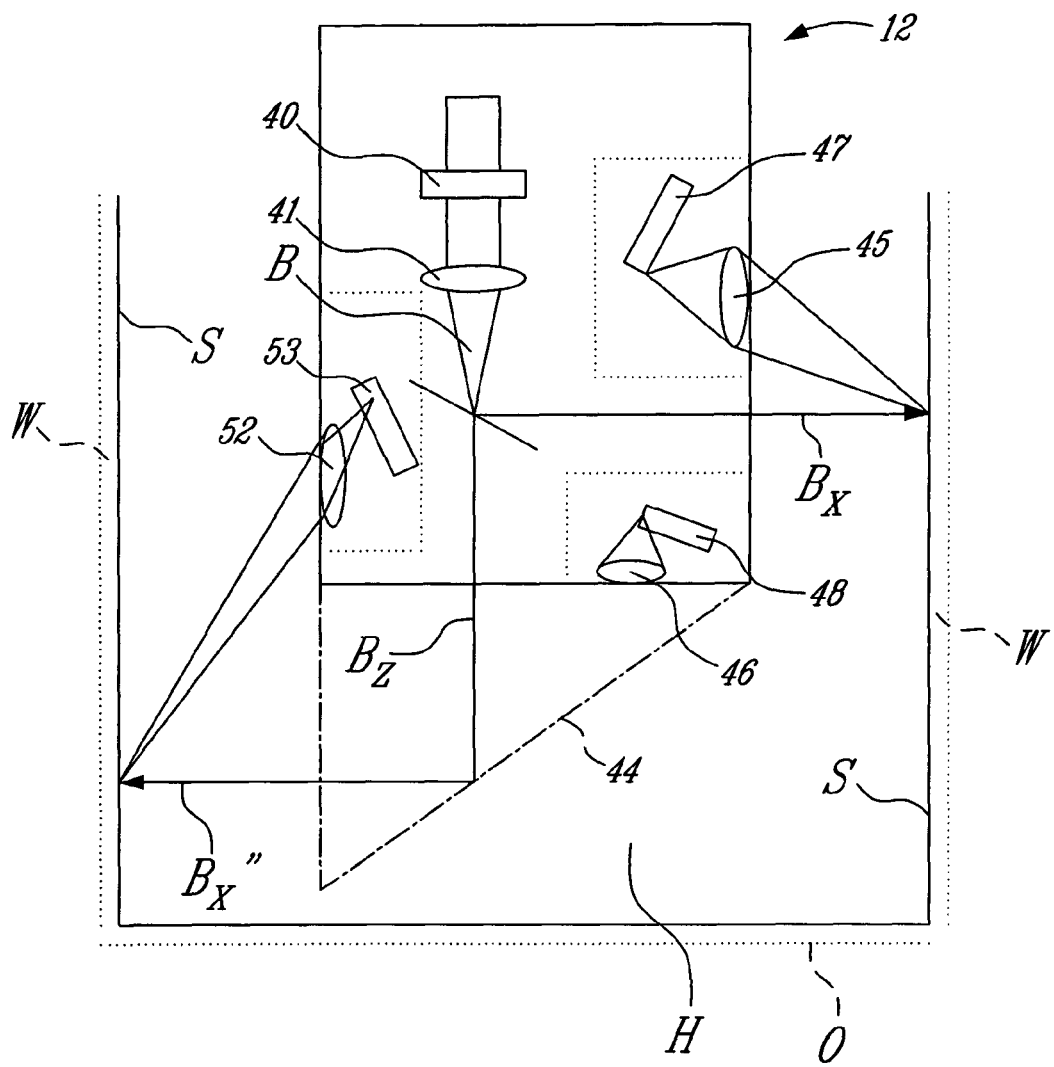
FIG. 7 is a schematic illustration of a multi-beam laser probe tip according to an illustrative embodiment of the invention wherein a prism is used to produce two parallel beams in opposite directions.

In FIG. 7 the prism 44 is reversed to produce beam Bx" parallel to beam Bx in plane ZX but in the opposite direction. In this latter illustrative embodiment, an additional set of detecting lens 52 and CCD detector 53 are provided to detect the image of the spot produced by the beam Bx" since the image of the spot is not detected by the lens 46 and detector 48.

Figure 8:
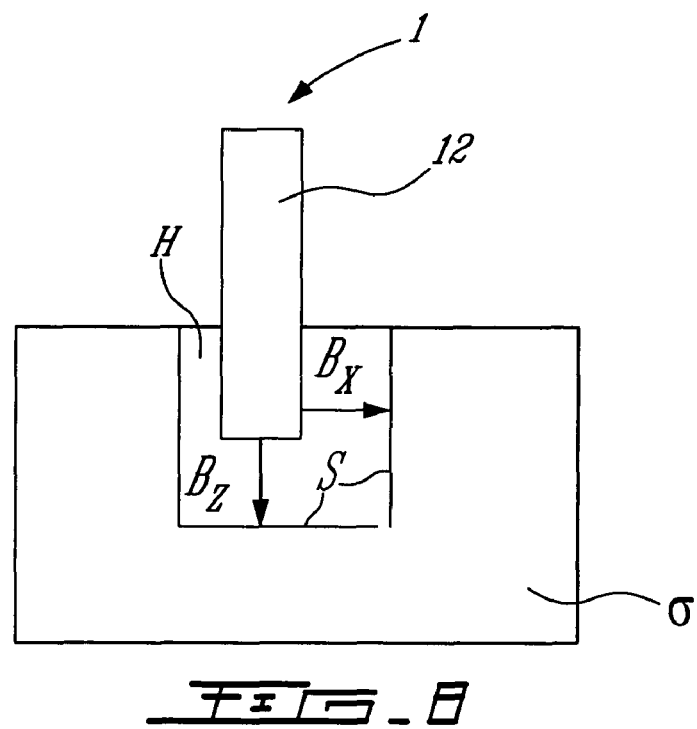
FIG. 8 shows a typical use of the multi-beam laser probe for the measurement of bore hole depth and perimeter.

FIGS. 8 through 12 show different uses of the probe 1. In FIG. 8, the probe is first positioned into a bore hole H using position feedback from the Z axis detector. The Beam Bz is then activated to measure the depth of bore hole H. In a next step, the probe 1 is rotated about the Z axis (by arm 2 not shown on this drawing) to enable acquisition of peripheral wall data at a given height in hole H using beam Bx. Alternatively, beam Bx could be rotated electromechanically should the probe be provided with a mirror rotating electronically controlled actuator. Dimensional data is transmitted to the microcomputer by the probe (see FIG. 2) and can then be analyzed by the software 31 to yield results 32 under chart or drawing form, which can be saved in data base 33.

Figure 9:
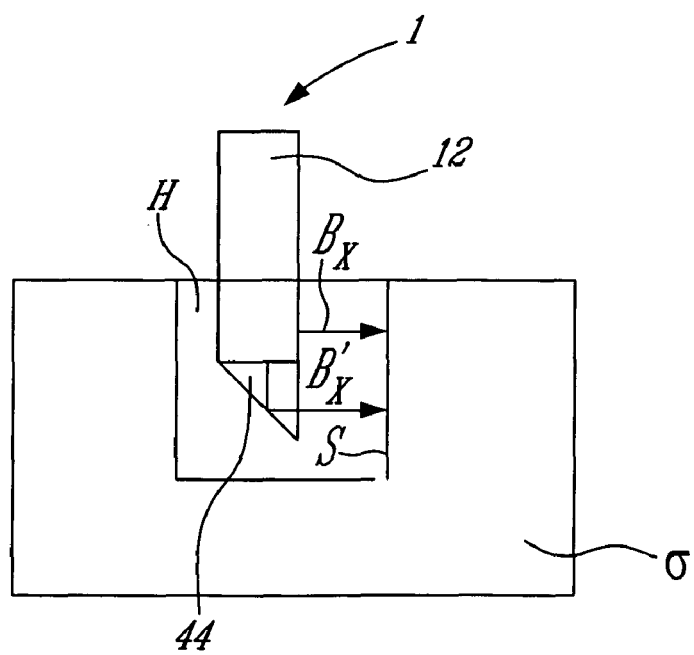
FIG. 9 shows an alternate probe configuration featuring parallel beams in the same direction, being used for detailed analysis of a bore hole peripheral wall without requiring vertical displacement of the probe.

FIGS. 9 and 10 show alternate probe configurations (parallel beams in the same or opposite directions) that can be used to perform further analysis of the peripheral wall surface S without requiring vertical displacement of the probe 1.

Figure 12:
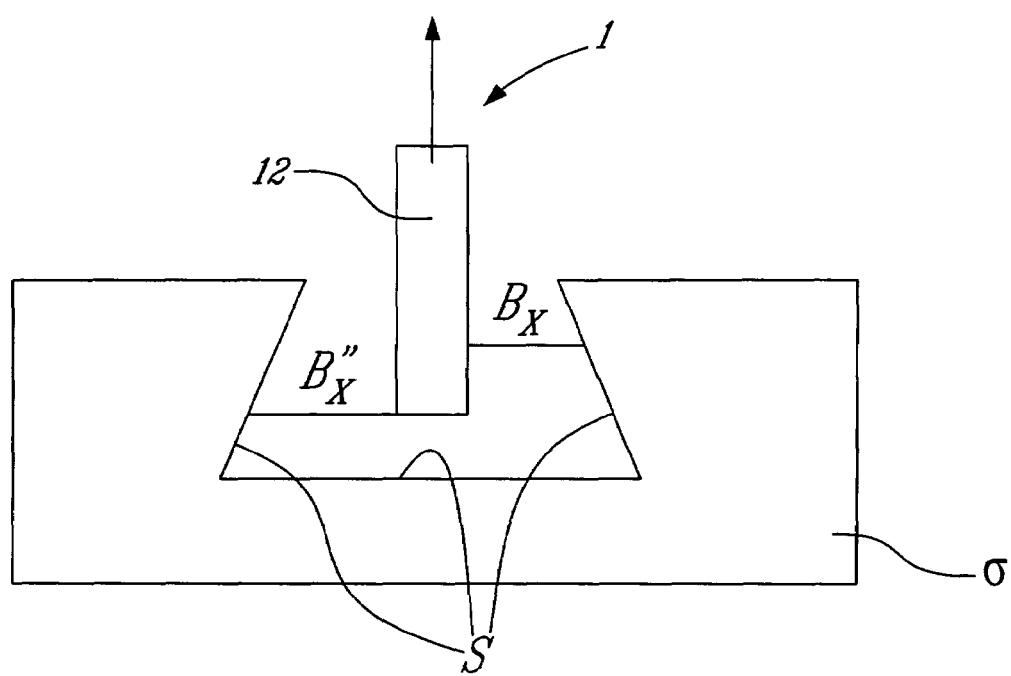

FIGS. 11 and 12 show applications similar to those of FIGS. 9 and 10, wherein mechanical rotation or translation of the probe 1 is used to analyze the details of conical walls.

Figure 13:
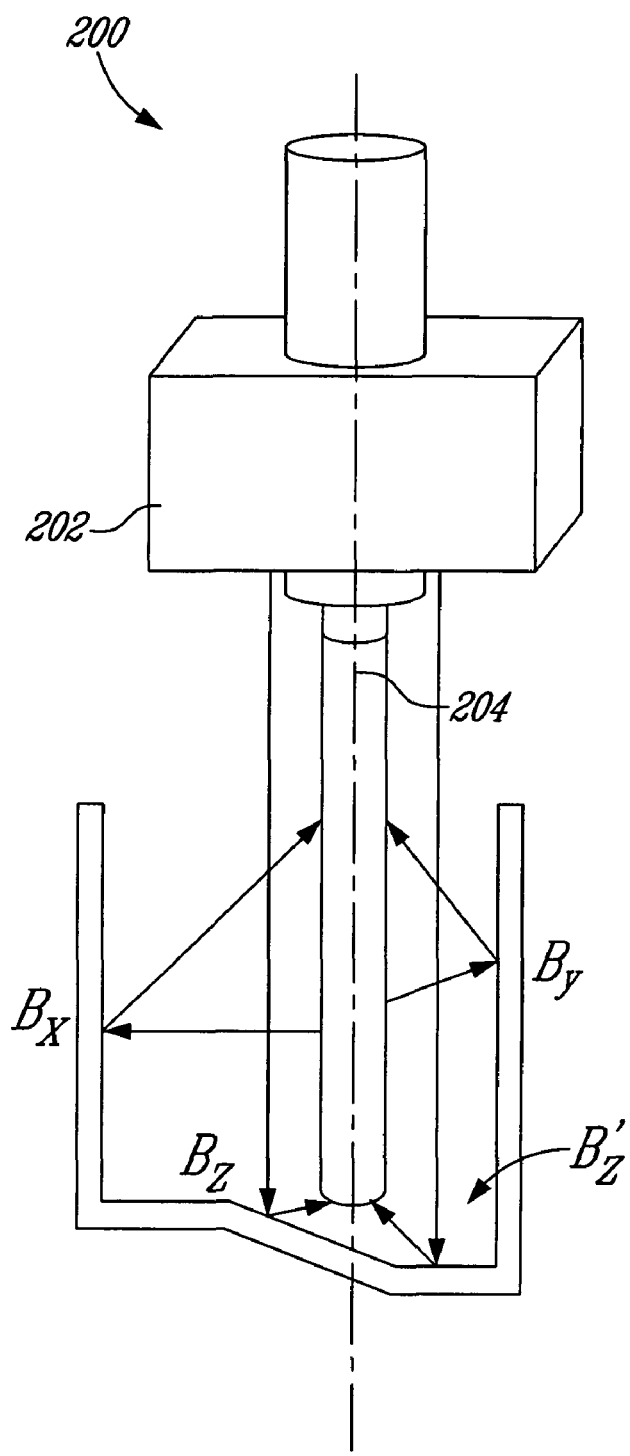
FIG. 13 is a schematic view of an electro-optic sensing probe according to another illustrative embodiment of the present invention.
Figure 14:
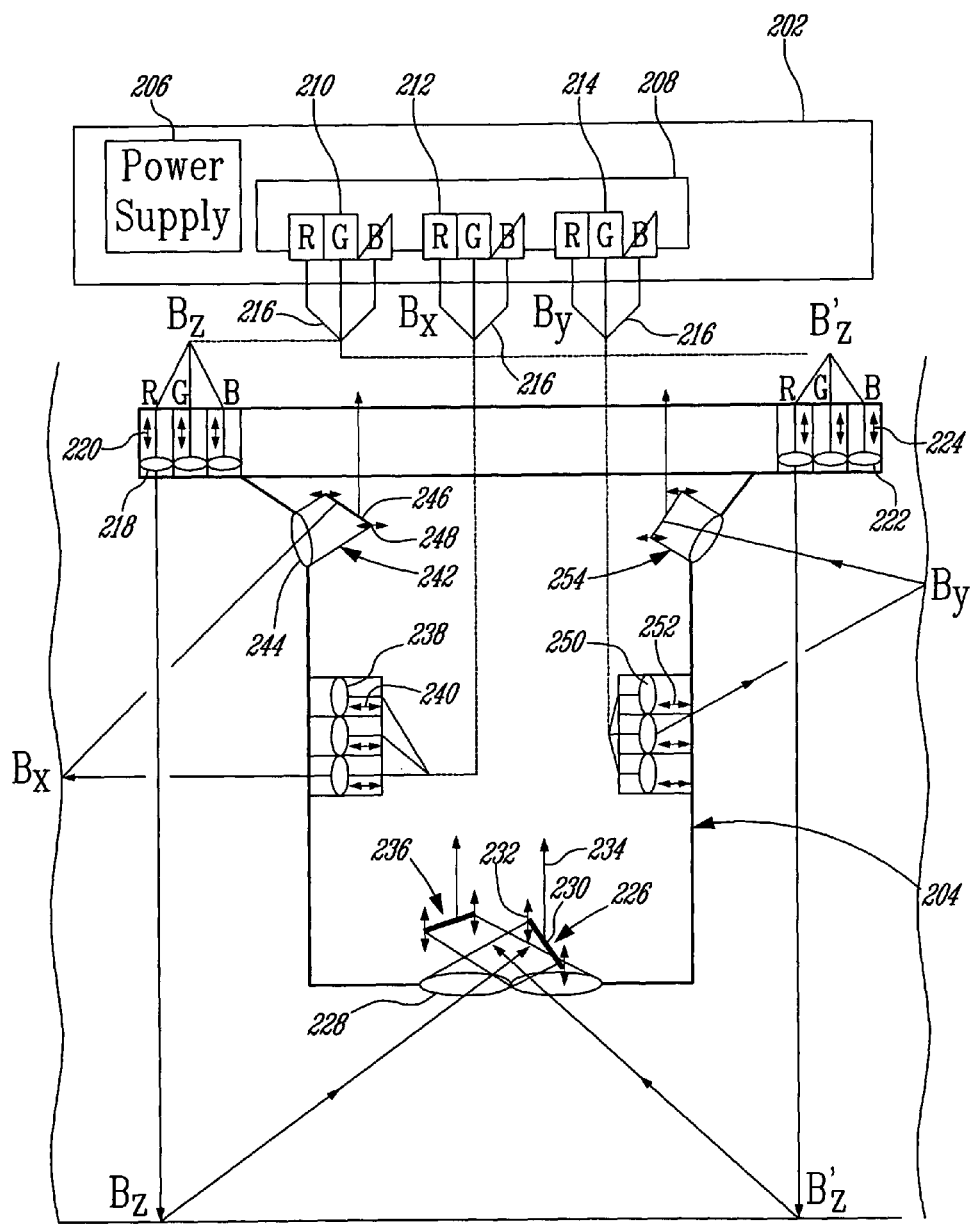
FIG. 14 is a schematic representation of the electro-optic sensing probe of FIG. 13.

Turning now to FIGS. 13 and 14 of the appended drawings, a probe 200 according to another illustrative embodiment of the present invention will be described. It is to be noted that since this probe 200 is similar to the probe 1 described hereinabove, and for concision purpose, only the difference between these probes will be described hereinbelow.

Generally stated, one major difference between the probe 200 and the probe 1 is that the laser diodes of the probe 200 are provided in the body 202 instead of the sensing tip 204. As can be seen from FIG. 13, two beams Bz and Bz' are emitted by the body 202 and two orthogonal beams Bx and By are emitted directly from the sensing tip 204.

FIG. 14 illustrates the probe 200 in greater details. This Figure shows that the probe 200 uses three different laser diodes for each of the three measurement beams Bx, By and By as will be described hereinbelow.

More specifically, the body 202 includes a power supply 206 and a laser diode arrangement 208 including three sets 210, 212 and 214 of three laser diodes (448, 550 and 660 nm, i.e. blue, green and red) each. Each laser diode is coupled to an optical fiber 216 transmitting the emitted light to a predetermined location as will be described hereinbelow.

The diode set 210 is used for both Bz and Bz' beams. The light from each fiber optic 216 is passed through a separate converging lens 218 to generate a light spot on the surface to be measured as described hereinabove. To increase measuring range of the probe in the Z direction, each converging lens 218 is provided with a miniature actuator (shown in FIG. 14 as an arrow 220), for example a piezoelectric actuator or a MEMS, to allow the focusing of the spot on the surface to be measured. A controller (not shown) of the probe 200 independently controls the miniature actuator 220.

As can be seen from FIG. 14, three separate lens 222 and associated miniature actuators 224 are used for the beam Bz'.

An optical sensor assembly 226 associated with the beam Bz includes a convex lens 228 is used to form an image or "picture" of the spot on a photo-detector 230. The optical sensor assembly 226 is provided with a miniature actuator (shown in FIG. 14 as arrows 232), for example a piezoelectric actuator or a MEMS, to allow the focusing of the spot onto the photo-detector 230. The miniature actuator 232 is controlled by the probe controller (not shown). Data regarding the position of the spot onto the photo-detector 30 is supplied to the body 202 (represented by arrow 234).

As can be seen from FIG. 14, the sensor assembly 236 used for the beam Bz' is very similar to the sensor assembly 226 used for the beam Bz and will therefore not be further discussed herein.

The diode set 212 is used for the Bx beam. The light from each fiber optic 216 is passed through a separate converging lens 238 to generate a light spot on the surface to be measured as described hereinabove. To increase measuring range of the probe in the X direction, each converging lens 238 is provided with a miniature actuator (shown in FIG. 14 as an arrow 240), for example a piezoelectric actuator or a MEMS, to allow the focusing of the spot on the surface to be measured. Again, the controller (not shown) of the probe 200 independently controls the miniature actuators 240.

The sensor assembly 242 used for the beam Bx is very similar to the sensor assembly 226 used for the beam Bz since it includes a converging lens 244, a photo-detector 246 and miniature actuator 248. The sensor assembly 242 will not be further discussed herein, for concision purpose.

The diode set 214 is used for the By beam. The light from each fiber optic 216 is passed through a separate converging lens 250 to generate a light spot on the surface to be measured as described hereinabove. To increase measuring range of the probe in the Y direction, each converging lens 250 is provided with a miniature actuator (shown in FIG. 14 as an arrow 252), for example a piezoelectric actuator or a MEMS, to allow the focusing of the spot on the surface to be measured. Again, the controller (not shown) of the probe 200 independently controls the miniature actuators 252. It is to be noted that FIG. 14 is schematic and that the Y direction is not orthogonal with the X and Z directions. However, one should note that the beam directions can vary depending on the design of the probe.

The sensor assembly 254 used for the beam By is very similar to the sensor assembly 226 used for the beam Bz and will therefore not be further discussed herein, for concision purpose.

In FIG. 14, the red diodes (660 nm) are shown emitting the Bx, By and Bz beams. Of course, the beams could be emitted by different color diodes.

As will be understood by one skilled in the art, the use of three different wavelengths for each beam allows objects made from many materials to be measured. Indeed, it is known that some material absorb more energy at particular wavelength. With the probe 200, it is possible to independently choose the desired diode, thus the desired wavelength, for each beam.

It is to be noted that it would be possible to design a probe using only one of each red, green and blue diode but it would mean that the same color would be used for the three beams Bx, By and Bz.

It will be apparent to one skilled in the art that more than 3 beams Bx, By and Bz, along with their sensors could be used and that the aiming direction of these beams can be variable or fixed depending on the probe design.

Figure 15:
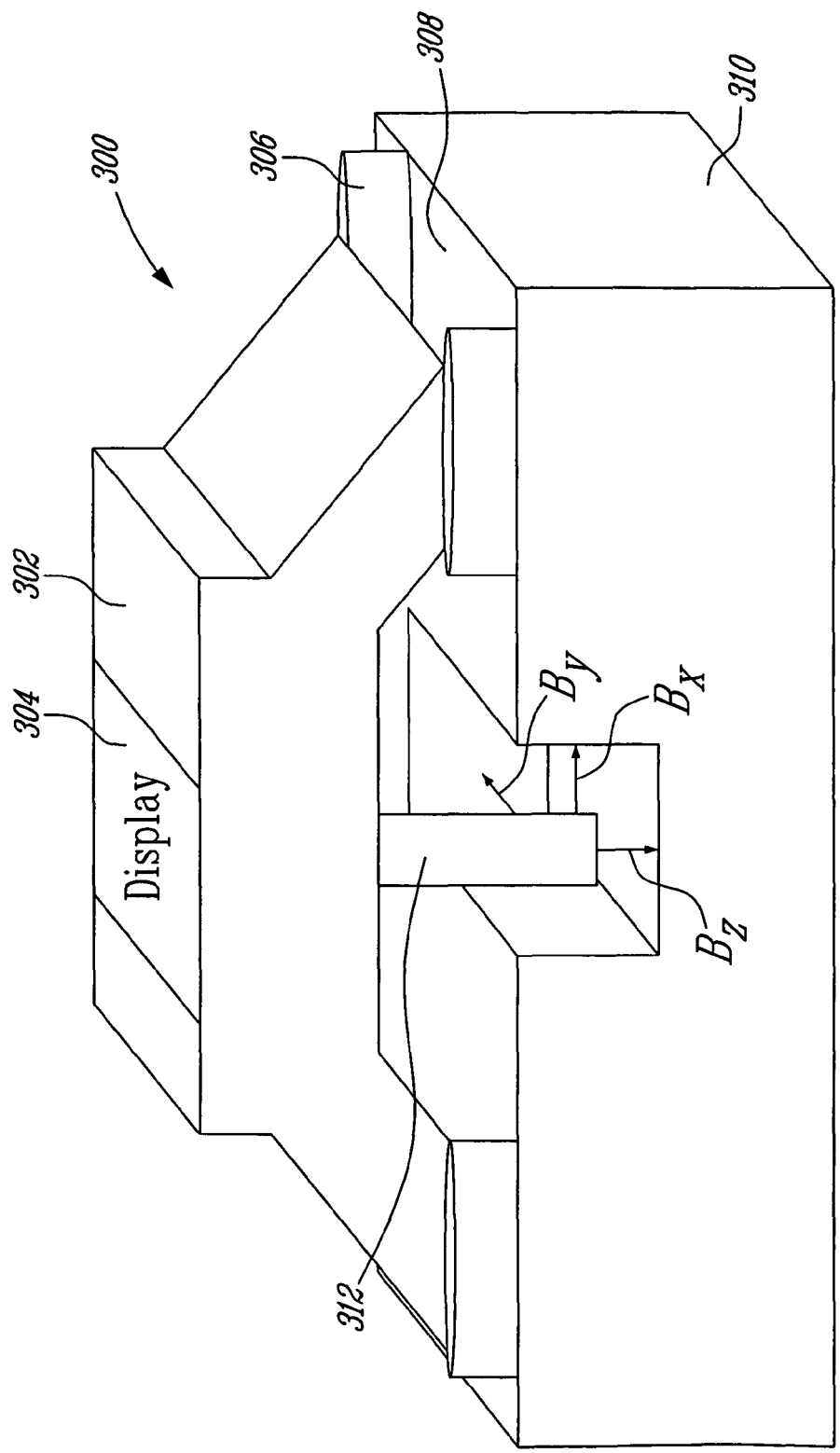
FIG. 15 shows a portable embodiment of the probe configured for manual use.

FIG. 15 shows a portable embodiment of a probe 300 configured for manual use. The body 302 of the probe is significantly larger, includes a display 304 and is supported on feet 306 to slide on a reference flat surface 308 of the measured object 310. Alternatively, the feet 306 could slide onto a glass plate (not shown) superposed or supported on or above the object's surface, should the object to be measured be devoid of a sufficiently large flat surface. The probe 300 also includes a sensing tip 312 generating three beams Bx, By and Bz to measure a feature of the object 310. The probe body 302 is manually translated on the reference surface to position the laser beams Bx, By and Bz at locations to be measured. The distances from a reference point to measured points are displayed on digital display 304 and stored in the probe memory (not shown). Stored data can then be transmitted (wireless or wired communication) to a microcomputer for analysis and result storage. This convenient embodiment of the probe 300 enables depth measurement, evaluation of point-to-point distance and surface finish determination, for example.

One can thus appreciate from the foregoing description, that the electro-optical sensor probe and system of the present invention provide fast, accurate, simple, safe and cost efficient non-contact dimensional measurement of objects in any material having specular surface and virtually any shape, thus overcoming the limitations and drawbacks of the prior art devices and systems. Automatic loading and unloading of the probe on a machine tool in cooperation with a dynamic mode control software enables quality control of the machined part at any time during machining to avoid spending further costly labor and time on scraped parts and reduce delays, complexity and expenses related to inspection at separate work stations. The multi-beam structure enables simultaneous measurements to be carried out without moving the probe to reduce holding arm displacement requirements which is believed to accelerate measurement by a factor of about 30, increases accuracy by excluding arm displacement related mechanical errors and relying on the intrinsic specifications of blue or green laser beams, and provides improved shape measurement versatility. Costly damages due to collisions are eliminated thanks to the optical feedback and sacrificial mechanical link, and the user friendly controlling software runs on a simple personal computer and can be used efficiently by unskilled personnel.

It is also to be noted that while a probe tip generating three simultaneous beams from the same laser source has been described herein, the number of beams and the number of laser source may vary.

It is also to be noted that while the measurement of relatively small distances on relatively small parts has been described hereinabove, one skilled in the at will have no problem to modify the measurement principle using multiple simultaneous beams as described hereinabove to measure greater distances on bigger objects. For example, the measurement of rooms could be done according to the general principles of the illustrative embodiments of the present invention described herein.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A multi-beam optical probe for the dimensional measurement of an object provided with a surface, the probe comprising:
    at least one light source;
    an optical device supplied with light from the at least one light source to produce a first light beam aiming at the surface of the object in a first direction, a second light beam aiming at the surface of the object in a second direction and a third light beam aiming at the surface of the object in a third direction, wherein the first, second and third directions are angularly spaced apart from each other and intersect with each other at a reference point, and the third direction is outside a plane formed by the first and second directions;
    a first optical sensor so configured as to detect a reflection of the first light beam scattered from the surface of the object;
    a second optical sensor so configured as to detect a reflection of the second light beam scattered from the surface of the object; and
    a third optical sensor so configured as to detect a reflection of the third light beam scattered from the surface of the object.

2. The multi-beam optical probe recited in claim 1, wherein the at least one light source includes a laser light source.

3. The multi-beam optical probe recited in claim 2, wherein the laser light source is a laser light source emitting light having a wavelength ranging from about 448 nm to about 660 nm.

4. The multi-beam optical probe recited in claim 1, wherein the first optical device includes a convergent lens.

5. The multi-beam optical probe recited in claim 1, wherein the optical device comprises a beam splitter positioned at the reference point and configured to split the light from the at least one light source so as to form the first, second and third light beams.

6. The multi-beam optical probe recited in claim 5, wherein the beam splitter is selected from the group consisting of semi-transparent mirrors having a low refraction index and prisms.

7. The multi-beam optical probe recited in claim 5, wherein the beam splitter further includes an electromechanically movable element to modify at least one of the first, second and third directions.

8. The multi-beam optical probe recited in claim 7, wherein the electromechanically movable element includes an optical element selected from the group consisting of a mirror, a prism and a diverging lens.

9. The multi-beam optical probe recited in claim 7, wherein the electromechanically movable element includes a piezoelectric actuator.

10. The multi-beam optical probe recited in claim 5, wherein the beam splitter is semi-reflective and is actuated for alternative rotation between two angular positions about an axis, whereby the first light beam is transmitted through the beam-splitter, the beam splitter reflects the second light beam according to one of the two angular positions and reflects the third light beam according to another of the two angular positions.

11. The multi-beam optical probe recited in claim 5, wherein the at least one light source comprises two light sources and wherein the beam splitter splits light from one of the two light sources.

12. The multi-beam optical probe recited in claim 1, wherein the first optical device further includes an electromechanically movable element to modify the direction or focusing of one of the first, second and third light beams.

13. The multi-beam optical probe recited in claim 12, wherein the electromechanically movable element includes an optical element selected from the group consisting of a mirror, a prism and a diverging lens.

14. The multi-beam optical probe recited in claim 12, wherein the electromechanically movable element includes a piezoelectric actuator.

15. The multi-beam optical probe recited in claim 1, wherein each of the first, second and third optical sensors includes a convergent lens so positioned and configured as to focus the scattered light from the corresponding first, second and third light beams onto a photo-detector.

16. The multi-beam optical probe recited in claim 15, wherein each of the first, second and third optical sensors further includes an electromechanical device for remotely moving the convergent lens and the photo-detector so as to shift a focusing area on the photo-detector.

17. The multi-beam optical probe recited in claim 16, wherein the electromechanical device includes a piezoelectric actuator.

18. The multi-beam optical probe recited in claim 1, further comprising a tool holder shank so configured as to be mounted to a spindle of a machine tool.

19. The multi-beam optical probe recited in claim 18, further comprising a body mounted to the tool holder shank.

20. The multi-beam optical probe recited in claim 19, further comprising a sensing tip mounted to the body by a brittle mechanical link.

21. The multi-beam optical probe recited in claim 20, wherein the brittle mechanical link includes a material selected from glass and ceramic.

22. The multi-beam optical probe recited in claim 20, wherein the sensing tip houses at least one of the at least one light source, optical device, reference point, first optical sensor, second optical sensor and third optical sensor.

23. The multi-beam optical probe recited in claim 1, wherein the first, second and third directions define three orthogonal directions.

24. The multi-beam optical probe recited in claim 1, further comprising:
- a manually displaceable probe body housing a controller and a display device;
- a sensing tip enclosing at least one of the optical devices, the reference point and the first, second and third optical sensors;
- wherein the manually displaceable probe body may be manually positioned onto the object to be measured at a desired position.

25. The multi-beam optical probe recited in claim 1, further comprising:
- a probe body enclosing the at least one light source;
- a sensing tip enclosing at least one of the optical devices, the reference point and the first, second and third optical sensors; and
- a brittle mechanical link interconnecting the sensing tip to the probe body;
- wherein the optical device is associated to the at least one light source by optical fiber going through the brittle mechanical link.

26. The multi-beam optical probe recited in claim 25, wherein the at least one light source includes:
- a first set of three laser light sources each having different wavelength ranging from about 448 nm to about 660 nm, the first set of three laser light sources being associated with the optical device; and
- a second set of three laser light sources each having different wavelength ranging from about 448 nm to about 660 nm, the second set of three laser light sources being associated with a second optical device.

27. The multi-beam optical probe recited in claim 26, wherein the optical device includes, for each of the three laser light sources of the first set, a converging lens and an electromechanical actuator.

28. The multi-beam optical probe recited in claim 26, wherein the second optical device includes, for each of the three laser light sources of the second set, a converging lens and an electromechanical actuator.

29. The multi-beam optical probe recited in claim 26, further comprising;
- a third optical device housed in the sensing tip; and
- a third set of three laser light sources each having different wavelength ranging from about 448 nm to about 660 nm, the third set of three laser light sources being associated with the third optical device.

30. The multi-beam optical probe recited in claim 29, wherein the third optical device includes, for each of the three laser light sources of the third set, a converging lens and an electromechanical actuator.

31. The multi-beam optical probe recited in claim 1, wherein the optical device includes one or more optical fibers.

32. The multi-beam optical probe recited in claim 31, wherein the one or more optical fibers comprise three optical fibers focusing light from three light sources.

33. The multi-beam optical probe recited in claim 1, wherein the first, second and third light beams are formed of light having at least two wavelengths.

34. A multi-beam optical probe system for the dimensional measurement of an object provided with a surface, the probe system comprising:
- a multi-beam optical probe comprising:
  - at least one light source;
  - an optical device supplied with light from the at least one light source to produce a first light beam aiming at the surface of the object in a first direction, a second light beam aiming at the surface of the object in a second direction and a third light beam aiming at the surface of the object in a third direction, wherein the first, second and third directions are angularly spaced apart from each other and intersect with each other at a reference point, and the third direction is outside a plane formed by the first and second directions;
  - a first optical sensor so configured as to detect a reflection of the first light beam scattered from the surface of the object;
  - a second optical sensor so configured as to detect a reflection of the second light beam scattered from the surface of the object; and
  - a third optical sensor so configured as to detect a reflection of the third light beam scattered from the surface of the object;
- a multi-axis controllable moving arm to which the multi-beam optical probe is so mounted as to be moved thereby; and
- a controller controlling both the multi-beam optical probe and the multi-axis controllable moving arm and receiving data from the first, second and third optical sensors.

35. A method for measuring an object provided with a surface, comprising:
- providing at least one light source;
- producing from the at least one light source a first light beam aiming at the surface of the object in a first direction, a second light beam aiming at the surface of the object in a second direction and a third light beam aiming at the surface of the object in a third direction, wherein the first, second and third directions are angularly spaced apart from each other and intersect with each other at a reference point, and the third direction is outside a plane formed by the first and second directions;
- detecting a reflection of the first light beam scattered from the surface of the object;
- detecting a reflection of the second light beam scattered from the surface of the object; and
- detecting a reflection of the third light beam scattered from the surface of the object.

* * * * *